United States Patent
Jonsson (10) Patent No.: US 7,257,646 B2
(45) Date of Patent: Aug. 14, 2007

(54) METHOD AND ARRANGEMENT FOR HANDLING INFORMATION PACKETS VIA USER SELECTABLE RELAY NODES

(75) Inventor: Björn Jonsson, Saltsjöbaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 751 days.

(21) Appl. No.: 10/311,090

(22) PCT Filed: May 17, 2001

(86) PCT No.: PCT/EP01/05647

§ 371 (c)(1),
(2), (4) Date: Dec. 12, 2002

(87) PCT Pub. No.: WO01/97461

PCT Pub. Date: Dec. 20, 2001

(65) Prior Publication Data

US 2003/0167340 A1    Sep. 4, 2003

(30) Foreign Application Priority Data

Jun. 15, 2000    (EP) .................................. 00112673

(51) Int. Cl.
*G06F 15/173* (2006.01)
*H04L 12/28* (2006.01)

(52) U.S. Cl. ................................... 709/244; 370/395.3
(58) Field of Classification Search ................. 709/232, 709/238–245, 249, 201, 202, 228; 370/396, 370/395.21, 395.3, 395.31

See application file for complete search history.

(56) References Cited

U.S. PATENT DOCUMENTS

| | | | | |
|---|---|---|---|---|
| 5,729,685 A | * | 3/1998 | Chatwani et al. | 709/224 |
| 6,134,589 A | * | 10/2000 | Hultgren | 709/227 |
| 6,256,300 B1 | * | 7/2001 | Ahmed et al. | 370/331 |
| 6,266,704 B1 | * | 7/2001 | Reed et al. | 709/238 |

FOREIGN PATENT DOCUMENTS

EP    0 915 594    5/1999

(Continued)

OTHER PUBLICATIONS

Jerome H. Saltzer, David P. Reed, and David D. Clark; "*Source Routing for Campus-Wide Internet Transport*"; XP 000619286; Massachusetts Institute of Technology; Local Networks for Computer Communication; North-Holland Publishing Company; © IFIP, 1981; 21 pages.

(Continued)

*Primary Examiner*—Saleh Najjar
*Assistant Examiner*—David Lazaro (57) ABSTRACT

The invention is related to a method in a communication network for handling traffic, such as data packets, from source nodes to destination nodes, via user selectable relay nodes. The relay nodes form an overlay network of nodes operated and managed by an overlay network operator. Communication between relay nodes relies on using packet forwarding services of intermediate networks being operated and managed independently by other operators. For any source/destination pair the overlay network operator may select an appropriate sequence of relay nodes to be passed depending on the required quality of service and the performance of different intermediate networks. The invention enables the control of the spreading of traffic between any two end-points over several alternative relay routes.

9 Claims, 9 Drawing Sheets

FOREIGN PATENT DOCUMENTS

| EP | 0915594 | * | 5/1999 |
|----|---------|---|--------|
| WO | WO 98/58474 | | 12/1998 |
| WO | WO 01/97461 | | 12/2001 |
| WO | WO 01/97462 | | 12/2001 |

OTHER PUBLICATIONS

David R. Cheriton; "*Sirpent™: A High-Performance Internetworking Approach*"; XP 000133120; Stanford University; Computer Communication Review; Sep. 19, 1989; No. 4., New York, US; pp. 158-169.

Cheriton, Mgritter; "*TRIAD: A New Next-Generation Internet Architecture*"; Computer Science Department, Stanford University; No Date; pp. 1-15.

IBM Technical Disclosure Bulletin; "*Bundling Short Packets In An ATM or Packet Network*"; XP 000189604; IBM Corp.; 1991; pp. 360-362.

ISR: PCT/EP 01/05647; Date Mailed Oct. 16, 2001.

Information Sciences Institute, "Internet Protocol Darpa Internet Program Protocol Specification", Sep. 1981, pp. 1-49.

\* cited by examiner

Original

METHOD AND ARRANGEMENT FOR HANDLING INFORMATION PACKETS VIA USER SELECTABLE RELAY NODES

This application is a national stage entry of PCT/EP01/05647, filed May 17, 2001, and claims priority of European Application No. 00112673.9, which was filed Jun. 15, 2000.

FIELD OF INVENTION

The present invention relates to communication in a communication network. In particular, the present invention relates to a method, a corresponding computer program and an arrangement for enabling users to influence the routing of their information packets.

DESCRIOTION OF RELATED ART

An internet is any set of networks interconnected with routers. The Internet is the biggest example of an internet. An internet may by functioning over wireline links, or over air interfaces, e.g. by means of short range radio waves, such as Bluetooth, or a mobile network.

The Internet is the worldwide interconnected WAN, based on the TCP/IP protocol suite. The complex problem of routing on large networks can be simplified by structuring a network into a hierarchy of smaller networks, where each level is responsible for its own routing. Basically, the Internet has three levels: the backbones, the mid-levels, and the stub networks. The backbones know how to route between the mid-levels, the mid-levels know how to route between the stub-networks, and each stub-network (being an autonomous system) knows how to route internally.

Each interconnected network includes one or more interconnected nodes. Communication between two nodes of the Internet is achieved by transmitting a digital stream, organized into packets, between the two nodes. The network layer of the Internet protocols is very powerful handling user packets travelling between any source node and any destination node over the Internet using intermediary internets having different technologies and separate administration. This is achieved by giving the full control of how the packets are routed to the networks that are involved and by making the addresses associated with each packet easily accessible. This implies that the user can not easily influence the routing of their packets and that said packets are open to the analysis and manipulation by interceptors. In this description, the term "user" refer to a computer sending packets.

The Internet Protocol (IP) formally specifies the format of Internet packets, called datagrams, and informally embodies the ideas of connectionless delivery. Connectionless delivery means that in a sequence of packets between two parties each packet is routed and forwarded independently having connection based communication. There is first a connection establishment phase when a forwarding phase is set up. Packets are then forwarded along this path until communication is terminated. The connection is then released. Analogous to a physical frame, the IP datagram is divided into header and data areas, the data area carrying the payload of the packet. Among other information, the datagram header contains the source and destination IP addresses, fragmentation control, precedence, and a checksum used to catch transmission errors. Besides fixed-length fields, each datagram header can contain at least one option field. The option field is of variable length, depending on the number and type of options used as well as the size of the data area allocated for each option. In an exemplary internet protocol called IP, each node in the internet is assigned an internet address which is unique over the entire internet. A node receiving a packet can identify the source and destination nodes by examining the IP addresses stored in the header.

For further information concerning Internet, see Information Sciences Institute, RFC 791 "Internet Protocol", September 1981. The IP addresses are assigned in a hierarchical fashion; the internet address of each node contains an address portion indicating the sub-network of the node, and a host portion, valid inside the sub-network, that identifies a particular host or router and discriminates between the individual nodes within a particular sub-network.

The idea of layering is fundamental in protocol design because it provides a conceptual framework for protocol design. In a layered model, each layer handles one part of the communication problem and usually corresponds to one protocol. Protocols follow the layering principle, which states that the software implementing layer "n" on the destination machine receives exactly what the software implementing layer "n" on the source machine sends. In practice, protocol software uses multiplexing and demultiplexing to distinguish among multiple protocols within a given layer, making protocol software more complex than the layering model suggests.

Internet Protocol (IP) provides one of the two major protocols used in internetworking. A user considers the Internet as a single virtual network that interconnects all hosts, and through which communication is possible; its underlying architecture is both hidden and irrelevant. Conceptually, an IP internet provides three set of services in three dependent layers. The three layers will be disclosed in more details below.

Figure 2:
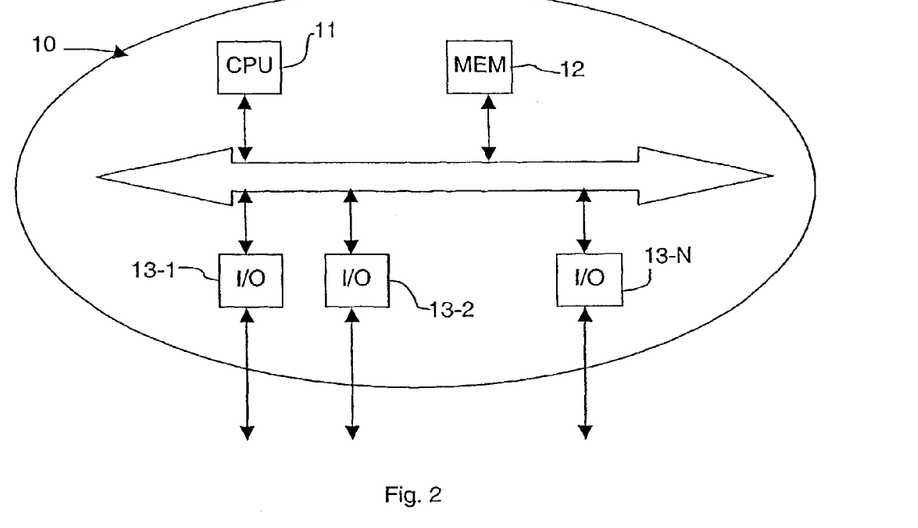
FIG. 2 is a diagram of a conventional node.
Figure 12:
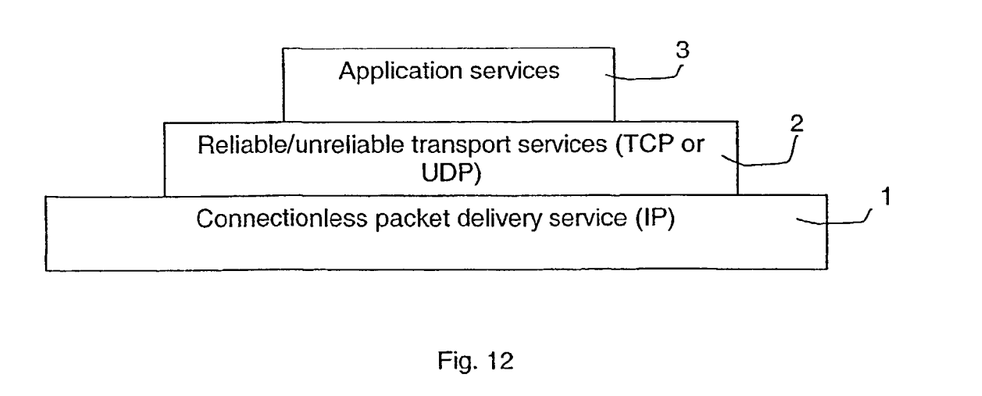
FIG. 12 is a diagram illustrating the three layers of the internet.

In FIG. 12 is depicted the three layers of an IP stack internet according to prior art; their arrangement in FIG. 2 suggests dependencies among them. At the lowest level 1, a connectionless delivery service provides a foundation on which everything rests. At the next level 2, a transport service provides a higher platform on which applications depend. I.e., internet software is designed around three conceptual networking services arranged in a hierarchy.

A disadvantage of the conventional Internet is that only one specific style of routing, e.g., hierarchical routing is easily supported by the current packet structure and packet transfer protocol. Routing is defined by protocols between routers. The resulting routing is neither controllable nor predictable by the sender. Thus, the conventional Internet does not readily permit a source node to specify the entire route or the manner via which a packet is routed. Nor is it simple for a user to redirect a packet via an alternate sequence of nodes, e.g., in order to obtain the required quality of service in the Internet. I.e. policy routing is performed by networks, not by users. Second, the source and destination node identification, routing and packet handling functions are performed arbitrarily in the conventional Internet. For example, if a specific quality of service is distinguished by low delay is requested in the packet, it is difficult to predict whether a node will handle the packet with a low delay or route the packet along a low delay route in order to achieve a low delay.

Basically, the Internet is a carrier of traffic from one point to another and the path followed between these two points is very much a decision by the networks that are involved and out of control for the user. However, there are situations when it is desirable to have better control of the routing. It is e.g. common that companies build Intranets comprising several independent sub-networks linked via external networks to form a company network. In order to fulfill company standards regarding, e.g. quality of service, preferred network operators should be used with which a company may have special agreements. It should also be simple to quickly switch between different operators or to adjust how traffic is divided between operators.

A known method to control the routing in an Internet is referred to as Source Routing (INTERNET-DRAFT; The Dynamic Source Routing DSR Protocol). Dynamic Source Routing (DSR) is a routing protocol designed e.g. for use in mobile ad hoc networks. The protocol allows nodes to dynamically discover a source route across multiply network hops to any destination in the ad hoc network. When using source routing, each packet to be routed carries in its header the complete, ordered list of nodes through which the packet must pass. A deficiency of DSR is that it requires knowledge of the network topology. This information is generally not available neither to the ordinary user, nor to any ordinary host in the network. Furthermore, the network topology may change at any moment invalidating previously discovered routes. Another deficiency of DSR is that the complete, ordered list including many addresses entail an extensive overhead. Furthermore, the content of the routing tables is not defined.

Another known way for the source to influence the routing of packets is to apply the method of "IP in IP" encapsulation. Said method means that an original IP-packet is wrapped into a packet destined to an intermediary node. The intermediary node removes the wrapping and forwards the packet to the original destination. Said method may be applied recursively. The encapsulated IP address is located in the payload, the payload being like any other message sent from one machine to another.

The patent U.S. Pat. No. 5,353,283 describes a method for transmitting a packet via a sequence of nodes in a network. The transmitted packet contains a sequence of one or more identifiers in a sequence of fields and a pointer pointing to a particular identifier in the sequence of identifiers in a field of a routing section of a header in the packet. A node of the sequence of nodes at which the packet is placed selects a forwarding table from a set of forwarding tables maintained in a memory at that node. The node then retrieves an entry from the selected forwarding table indexed by the identifier in the sequence of identifiers pointed to by the pointer. The node then transmits the packet to the next node of the sequence of nodes indicated by the retrieved forwarding table entry. The method according to U.S. Pat. No. 5,353,283 is useful e.g. for private virtual networks, and virtual global ISP and is transparent to intermediary networks.

The deficiency with the method according to U.S. Pat. No. 5,353,283 is that it requires a new type of header and does not function in the currently available Internet, i.e. the method according to U.S. Pat. No. 5,353,283 requires a new standard. Said method functions only over networks having implemented said new standard. Furthermore, the overhead is large.

One of the problems that derive from the attachment of existing IP Networks to the Internet is that local hosts must have globally unique addresses in order to be identified by the backbone routers of the Internet. The Internet routers are not able to route packets correctly if the IP addresses are not unique. End-users connected to hosts not having proper addresses cannot be reached, and cannot establish application sessions.

Network Address Translation (NAT) solves the problem by reassigning IP addresses. It uses a pool of available globally unique addresses that are repeatedly reused. Internal Network addresses are allocated according to internal considerations of the Network. There are sets of addresses assigned for local use. Said addresses are not valid outside local networks and may therefor be reused a number of times for internal addressing in different local networks. Global addresses must remain unique in order to distinguish between different hosts. When an outbound packet is routed, the NAT replaces the locally valid address with a temporary global address. As soon as the application session is over, the global address may be returned to the pool to be reassigned. It should be noted that NAT only involves a translator at the sending side and no communication is needed with other network nodes, e.g. an address translator at the receiving side.

NAT enhances the level of security within the Network by hiding its internal structure. NAT also permits a number of users to share a smaller number of global addresses because global addresses are required only when a user communicates outside the local subnet. If the external connectivity of a subnet is changed from one external network to another, there is no need to replace the IP address of each and every host on the internal net—the task is accomplished by the NAT.

SUMMARY OF THE INVENTION

The main problem with routing in a conventional internet is that the users cannot influence the routing of their packets.

Another problem with routing in a conventional internet is that, as the source and destination addresses are placed in the header of each packet, an intruder may easily trace messages.

A further problem with routing in a conventional internet is that it is difficult for an intermediary node to redirect a packet via alternate sequences of nodes based on user preferences.

A yet further problem with the method according to U.S. Pat. No. 5,353,283 is that it can only function with a new standard, and that said new standard must be implemented in every network over which the packets passes.

Another problem with routing in the conventional Internet is that it is not possible to construct a dynamically controllable overlay network in order to make the performance more effective and controllable by users.

The solution to the above disclosed problems is a method and arrangement in a communication network for handling traffic, such as information packets, from source nodes to destination nodes, via user selectable relay nodes. The relay nodes form an overlay network of nodes, operated and managed by an overlay network operator. Communication between relay nodes relies on using packet forwarding services of intermediate networks being operated and managed independently by other operators. Information about every packet affected by an error is returned to a common supervisory node. For any source/destination pair the overlay network operator may select an appropriate sequence of relay nodes to be passed depending on the required quality of service and the performance of different intermediate networks. Traffic having different requirements on quality of service may thus be routed via different relay proxies and thereby via different intermediary networks. Between source and destination, packets often have to traverse several networks operated by different operators eg. Local access network, a first regional network, a first backbone network, a second backbone network, a second regional network and the destination local access network. It is up to the overlay network provider to collect information concerning the performance of different networks and configure the implementation of the overlay routing. The software handling this may be allocated to the RSS, or another server providing directions to the RSS.

The main purpose of the invention is to control the spreading of traffic between any two end-points over alternative relay routes.

A further purpose of the invention is to provide an overlay network that has a relatively small number of nodes and where their configuration can be relatively static while the number of originating nodes and destination nodes can be large and their configuration very dynamic.

Another purpose of the invention is to prevent an interceptor at any relay node from relating a packet to a specific original originator or final destination.

A further purpose of the invention is to prevent forward and return packets from being correlated, and thus to enhance the security.

A yet further purpose of the invention is to make it possible to influence how packets are routed via intermediary networks based on quality of service requirements, service level agreements and related costs offered by different network providers and costs.

A further purpose of the invention is to enable an efficient handling of errors and error-messages as information about every packet affected by an error is returned to a common supervisory node that gets a networkwide view of performance.

An advantage of the invention is that the method is useful for protection against interceptors by hiding the identities of the communicating parties. Moreover, an interceptor cannot find out which packets are related in the forward and return streams of packets.

An advantage of the invention is that traffic between an overlay network of nodes can be dynamically arranged without interfering with the interior behavior of the intermediary networks that are used. This can e.g. be used to induce packets having different types of service to take different routes by travelling via different relay nodes, and to direct traffic to different routes at different times in order to improve the throughput and in order to minimize costs.

An advantage of the invention is that the overlay network of nodes can consist of a relatively small number of nodes and their configuration can be relatively static while the number of originating nodes and destination nodes can be large and their configuration very dynamic.

Another advantage of the invention is that an interceptor at any relay node cannot relate a packet to a specific originator or destination. Due to the herein disclosed address substitution it is much more difficult to manipulate the communication between communicating parties as packets are anonymously mixed into the total flow of traffic.

A further advantage of the invention is that forward and return packets cannot be correlated, and thus the security is enhanced.

A yet further advantage of the invention is that it is possible to influence how packets are routed via intermediary networks based on quality of service requirements, service level agreements with different network providers and costs.

Another advantage of the invention is that it enables an efficient handling of errors and error-messages as information about every packet affected by an error is returned to a common supervisory node that gets a networkwide view of performance.

The term "comprises/comprising" when used in this specification is taken to specify the presence of stated features, integers, steps or components but does not preclude the presence or addition of one or more other features, integers, steps, components or groups thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will now be described in more detail with reference to preferred exemplifying embodiments thereof and with reference to the accompanying drawings.

DETAILED DESCRIPTION

Figure 1:
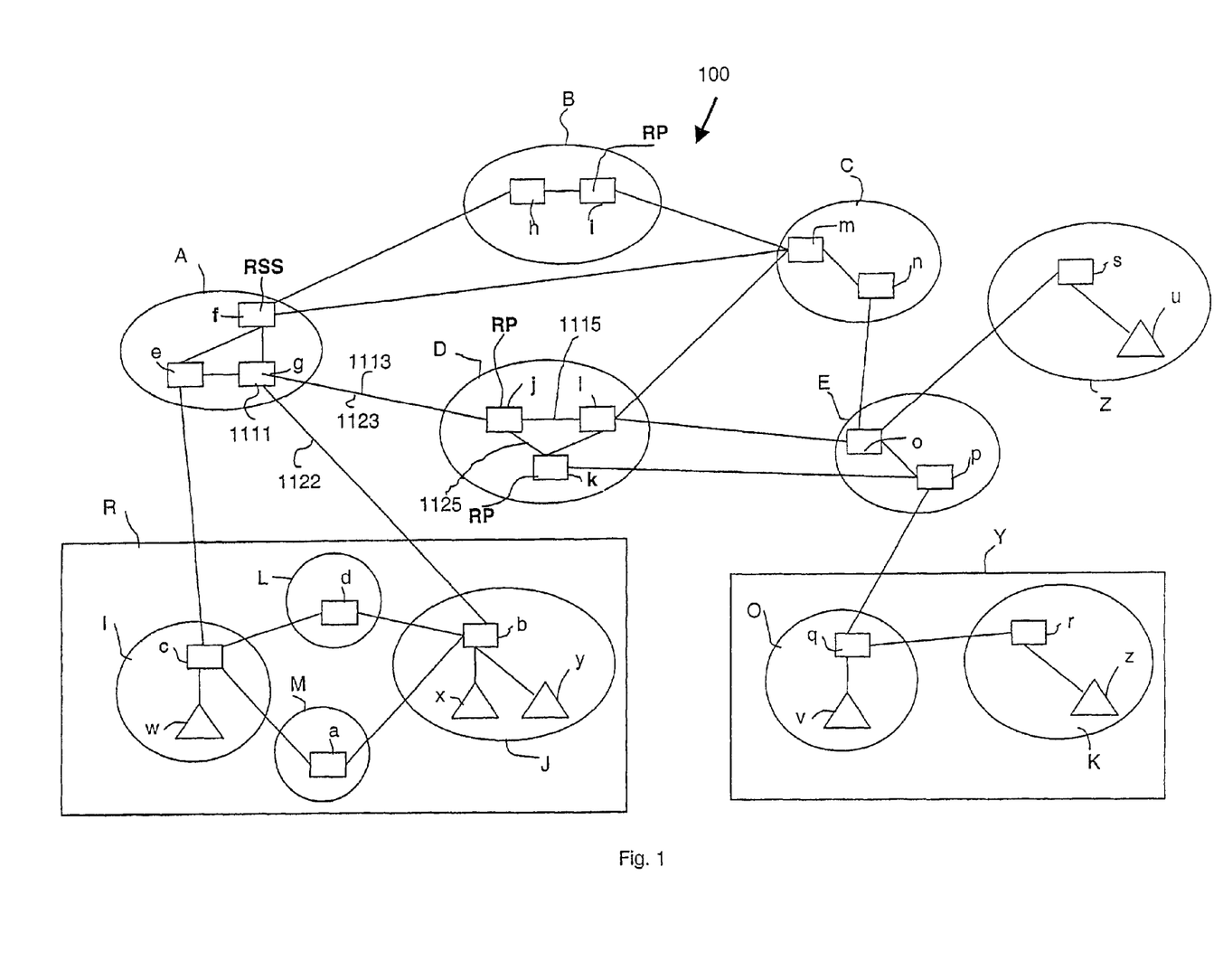
FIG. 1 is a diagram of a conventional Internet.

An Internet communication network 100 is depicted in FIG. 1 including five transit or backbone networks A, B, C, D, and E and three stub networks R, Y, and Z. A "backbone" network is an intermediary network which conveys communicated data from one network to another network. A "stub" network is a terminal or endpoint network from which communicated data may only initially originate or ultimately be received. Each network, such as the stub network R, includes one or more interconnected sub-networks I, J, L and M. As used herein, the term "sub-network" refers to a collection of one or more nodes, e.g., (d), (a), (b, x, y), (q, v), (r, z), (s, u), (e, f, g), (h, i), (j, k, l), (m, n), and (o, p), interconnected by wires or switches for local inter-nodal communication. Nodes within a parenthesis belong to the same sub-network. Each sub-network may be a local area network or LAN. Each sub-network has one or more interconnected nodes of which nodes u, v, w, x, y, z are host computers ("hosts") and nodes a, b, c, d, e, f, g, h, i, j, k, l, m, n, o, p, q, r, s are routers. A host is an endpoint node at which communicated data may initially originate, or ultimately be received. A router is a node that serves solely as an intermediary node forwarding packets between two other nodes. The routers receive communicated data from one node, and retransmit the data to another node. Collectively, backbone networks, stub networks, sub-networks and nodes are referred to herein as "Internet systems".

Figure 3:
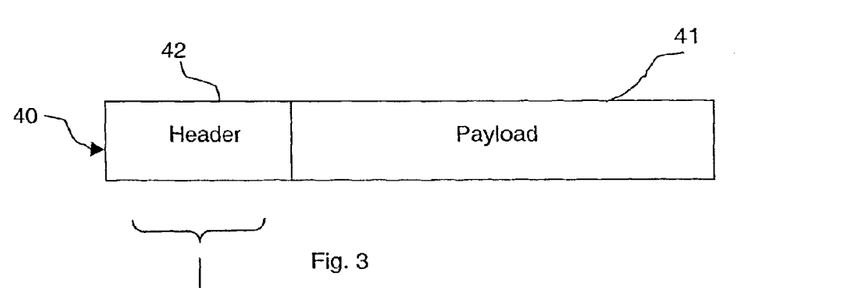
FIG. 3 is a diagram of a conventional packet structure.

FIG. 2 shows a block diagram of a host or router node 10. As shown, the node 10 includes a CPU 11, a memory 12 and one or more I/O ports 13-1, 13-2, . . . , 13-N connected to a bus 14. Illustratively, each I/O port 13-1, 13-2, . . . , 13-N is connected by wires, optical fibers, and/or switches to the I/O port or another node. The I/O ports 13-1, 13-2, . . . , 13-N are for transmitting communicated data in the form of a bit stream organized into one or more packets to another node and for receiving a packet from another node. An exemplary packet 40 is shown in FIG. 3 having a payload 41 which contains communicated data and a header 42 which contains control and/or address information.

A host, which initially generates a packet for transmission to another node, is called the source node and a host, which ultimately receives the packet, is called a destination node. Communication is achieved by transferring packets via a sequence of nodes including the source node, zero or more intermediary nodes, and the destination node, in a bucket brigade fashion. The nodes within the aggregation of networks that makes up the Internet exchange reachability information between each other and each node individually computes its next hop forwarding directions for each final destination. For example, a packet may be communicated from the node w to the node x by transferring the packet from the node w to the node c, via node d to the node b, and to the node x.

For purposes of communication, there are three fundamental categories of functions performed by each node:
(1) identification of source and destination nodes for individual packets,
(2) routing , i.e., the process of choosing an interface over which to send packets,
(3) handling packets, which includes all functions not falling into categories (1) and (2) such as prioritizing each packet received at a node for transmission, etc.

In addition to the end to end payload, each packet also has a header portion. The performance of the functions mentioned above is effected by control information written by a transmitting node in the header of the packet. In particular, the execution of these functions in a conventional Internet depends on unique Internet addresses associated with the source and destination nodes and "Quality of service" information written in the header. Internet addresses and Quality of Service information as well as their effects on the identification, routing and handling functions are described in greater detail below.

Figure 4:
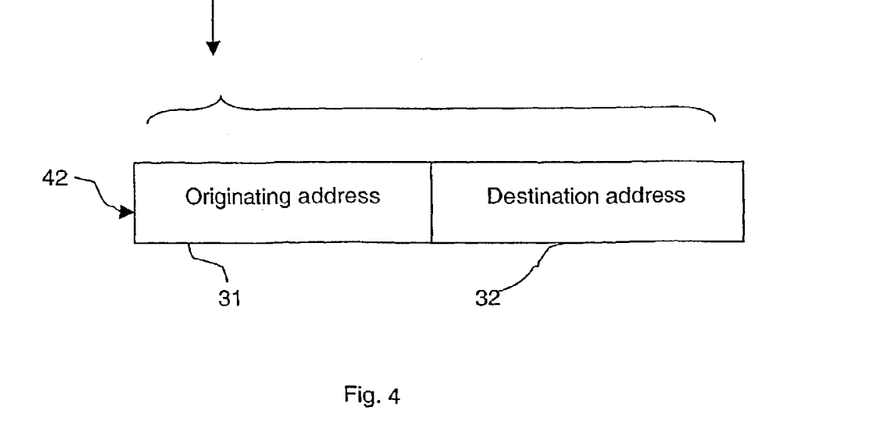
FIG. 4 is a diagram of a conventional IP address.

FIG. 4 shows the address part of the header 42 of FIG. 3. The address part 42 comprises two fields. A first field 31 containing the address of the originating node, and a second field 32 containing the address of the destination node.

Now, a Relay Proxy node and its functionality according to the disclosed herein method will be disclosed referring to FIG. 1. A Relay Proxy is selected by a Route Setup Server RSS, e.g. the node f in FIG. 1. An RSS defines the relationship between temporarily substituted addresses and the real originator and destination addresses. Temporarily substituted addresses will be disclosed in more detail below. Three Relay Proxies are installed in an internet network according to FIG. 1. In this example, the relay proxies are arranged at the nodes j and k. A Relay Proxy node is an intermediary node dividing the route between an originating node and a destination node into two partial routes. Here, three Relay Proxies divide the route between an originating node w and a destination node v. Between the nodes packets travel by normal Internet routing.

In FIG. 1, an overlay network comprises an RSS, in node f, and three RP in the nodes i, j and k. In the network 100 disclosed in FIG. 1, using the overlay network comprising Relay Proxies in the nodes j and k, the communication from the originating node w to the destination node v may take four different paths:

First path: w→(c,e,f)→(h,i)→(m,n,o,p,q)→v
Second path: w→(c,e,g)→j→(l,o,p,q)→v
Third path: w→(c,e,g)→j→k→(p,q)→v
Fourth path: w→(c,e,g)→(j→k→l)→(o,p,q)→v By introducing an overlay network of Relay Proxies, packets can be diverted being controlled by the operator of the overlay network, without interfering with the internal routing inside intermediary networks. By relaying via different Relay Proxies, the operator of the overlay network can influence the routing of packets. Only one Relay node may be used, but also more relay nodes may be inserted between an originating node and a destination node. Furthermore, forward and return traffic and different classes of service may be diverted separately.

The insertion of Relay nodes is controlled by the control node (RSS) belonging to the overlay network operator by means of signaling towards user nodes and Relay Proxies. When a controlling node wants to insert Relay Proxies to be passed by traffic between two nodes, the controlling node first communicates with the Relay Proxies that have been chosen, and with destination nodes, in order to get the necessary relay associations set up. Thereafter, when the originating node communicates with the destination node, the packets travel via the chosen relay node (or nodes) when travelling towards the destination. Neither control protocols within the intermediary networks nor the routing of packets through these networks are affected.

Figure 6A:
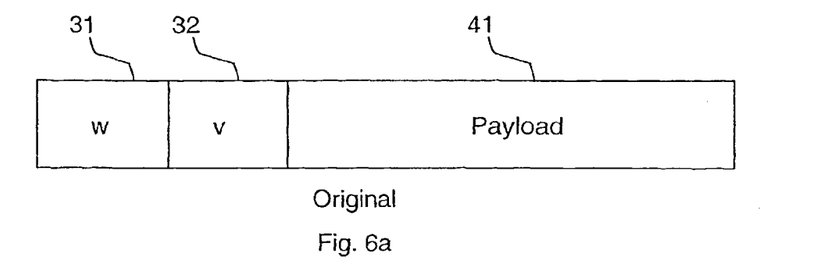
FIGS. 6a-6d are diagrams of a transparent substitution of addresses according to the invention.
Figure 6B:
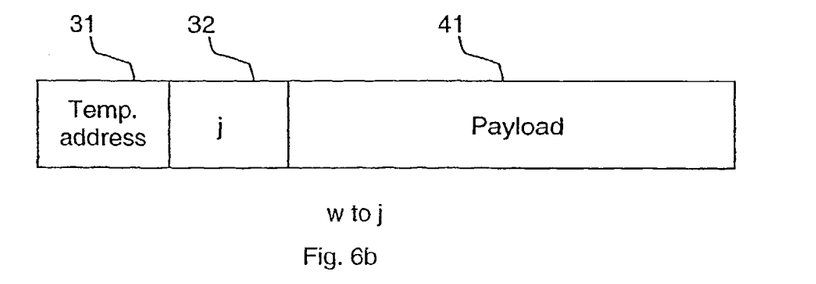
Figure 6C:
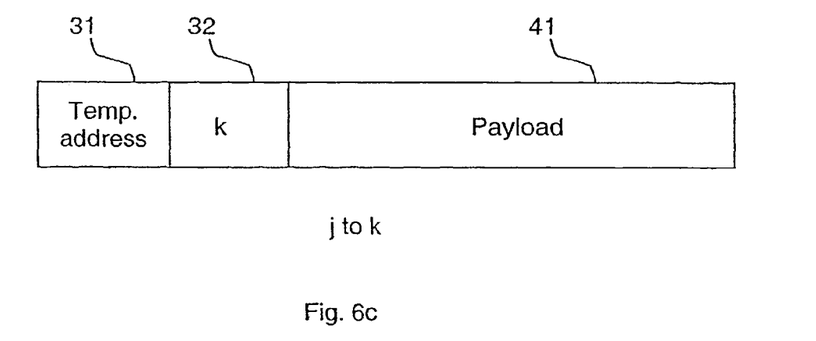
Figure 6D:
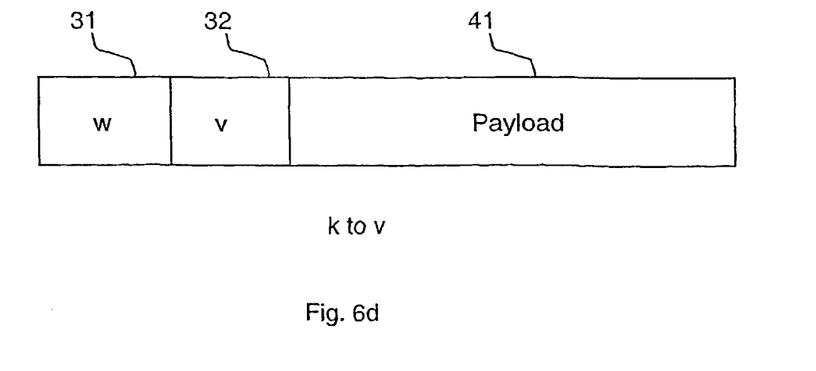

When the originating node w in FIG. 1 is sending a packet to the destination node v an address substitution process is conducted by the RSS, located in node f. The substitution process will be disclosed with reference to FIG. 6 a-d. The packets depicted in FIG. 6 comprises a sending address field 31, a receiving address field 32 and a payload 41. First, before the packet leaves the first node w, the address field 31 of the originating node w contains the address of the originating node w, and the address field 32 of the destination node v, see FIG. 6a. Then, the RSS allocates an address to be used as a temporary substitution for the originating address. The address of the destination is substituted by the address of the first Relay Proxy node j, see FIG. 6b. At the first Relay Proxy node j, the originating address field 31 contains the temporary address and the destination field 32 contains the address of the second Relay Proxy node k, see FIG. 6c. In order to enable the relay node to put the appropriate next relay node destination address into the destination address field before relaying the packet, the association between the current temporary originating address and the next step destination address to be used must previously have been stored in the memory in the relay node providing the substitution. This is prepared by RSS, connected to the node f, sending the needed information to the relay node. The substitution procedure is iterated in each relay node that is to be passed until the packet reaches the final destination. When the packet arrives at the destination node v, the originating address field 31 shall be provided with the address of the originating node w, and the destination field 32 shall be provided with the address of the destination node v. See FIG. 6d. To accomplish this the original address have to be restored by the last relay node. To this end, the last relay node must beforehand have stored the association between the temporary originator address and the original address. The required information is prepared by the RSS. After the last substitution, the original packet is restored making the in-between actions transparent to the receiver. As packets travelling between the original source and destination carries a temporary address belonging to RSS and messages about errors are sent to the owner of the temporary address RSS instead of to the original sender. Thus, RSS will get an overall knowledge of network performance.

For the user, it is of no importance how the packets travel between the originating node w and the first Relay Proxy node. A packet may travel, w→c→e→g→j , or w→c→e→f →g→(j). In addition, between the Relay proxies, it is of no importance how the packets travel. A packet may travel (j)→(l)→(k) or (j)→(k). Furthermore, it is of no importance how the packets travel between the last Relay Proxy node k and the destination node v. A packet may travel (k)→(l)→ (m)→(n)→(o)→(p)→(q)→(v) or (k)→(p)→(q)→(v).

Figure 5:
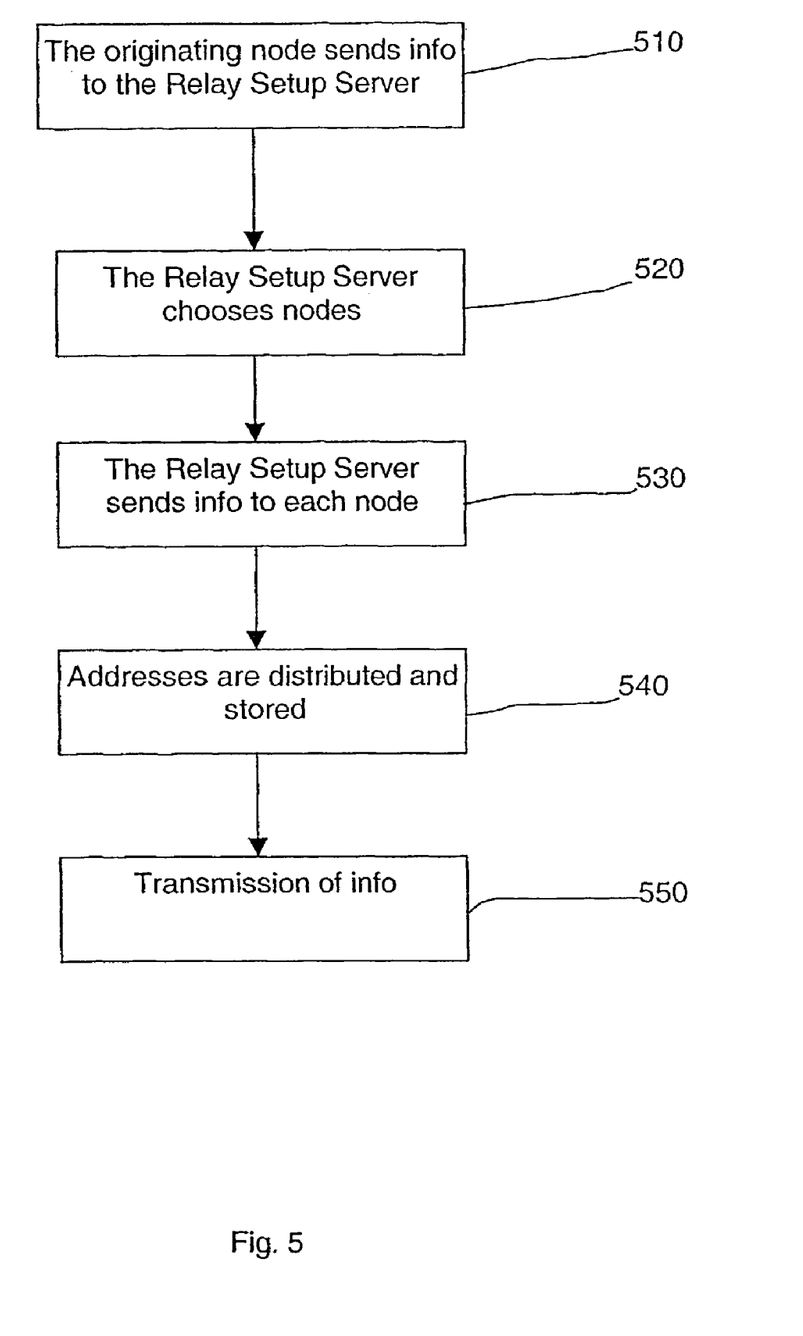
FIG. 5 is a flow chart illustrating the relay setup procedure.

FIG. 5 shows a flow chart of the Relay Setup procedure. The setup of a relay path is controlled by the Relay Setup Server in node (f). This server can be a dedicated server or collocated with some other servers. In block 510, the setup of a path is requested by the originating node (w) sending its originating address, the destination address and any type of information that is relevant for the relay routing (e.g. type of service) to the Relay Setup Server. Thereafter, in block 520, the Relay Setup Server chooses the relay nodes to be used and sends, in block 530, the relevant information to each of them in order to define how incoming traffic is to be relayed. This information comprises the temporary address substituting the originator address and the address to be used as the destination address to the next relay node. The temporary address to be used is allocated by the Relay Setup Server in node (f) from a pool of temporary addresses. The temporary address is sent together with the original originator address to the last relay node. The temporary address is sent together with the destination address of the first relay node to the originating node.

When the addresses have been distributed and stored, in block 540, the transmission of information may start, in block 550.

In the disclosed herein method, the fundamental principle is substitution of addresses. A pool of addresses is reserved for temporary use by the RSS as described in the following text and illustrated in FIG. 6.

Figure 7A:
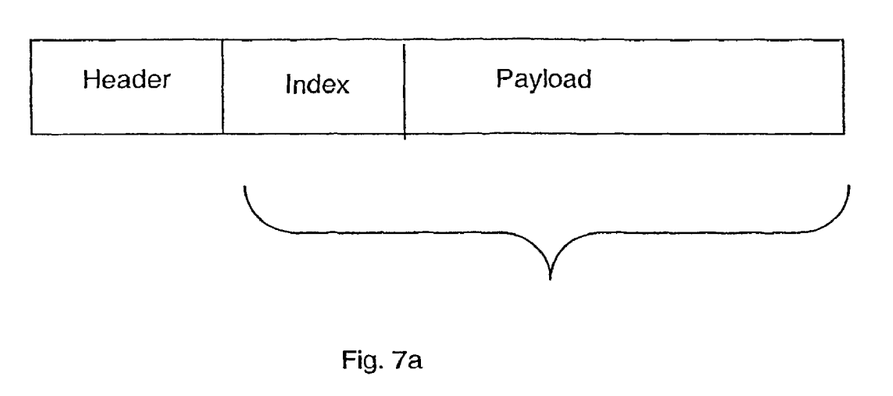
FIGS. 7a-7b are diagrams of a packet used in the indexing procedure.
Figure 7B:
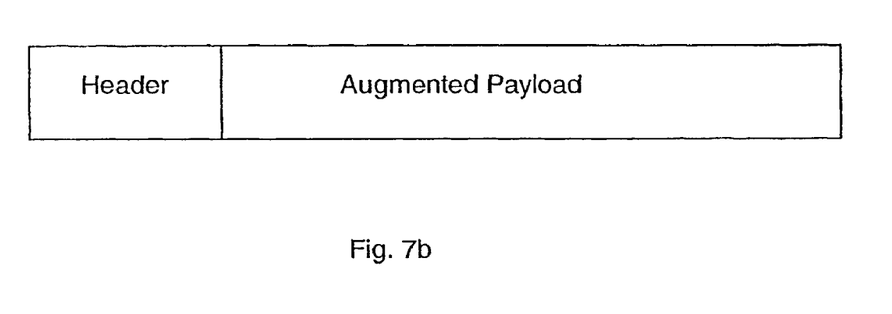

In a further preferred embodiment, a method for indexing temporary addresses is used. Instead of using a pool of reserved addresses for the Relay Setup Server (RSS) to allocate as temporary addresses, an indexing method can be used. The Relay Setup Server then uses an address of its own as the temporary address but also allocates an index. Said index is then inserted in the IP packet as a substitute for individual temporary addresses. Every packet is thus provided with an extra field carrying that index. The extra field is placed as a temporary addition to the payload and it does not affect the routing of packets through intermediary networks. The combination of temporary address and index is uniquely allocated by RSS. In this way, a new packet format is introduced but the routing of packets through the intermediary networks is not affected. Only the relaying nodes have to be aware of this modified packet format and they can identify when it is used by recognizing the address of the Relay Setup Server in the originator address field. In FIG. 7a, a packet for usage by the indexing method is shown. Each new packet is provided with a unique index by the RSS. The index is stored in the Payload Relay as an extra field. The index field and the original payload field form an augmented payload field, as is shown in FIG. 7b. Intermediary nodes are not aware of the indexing and does not know that an Augmented Payload field contains an index indicating the true original address. The method using index is thus transparent for the user and protects the system so that an external observer cannot see the original address.

Figure 8:
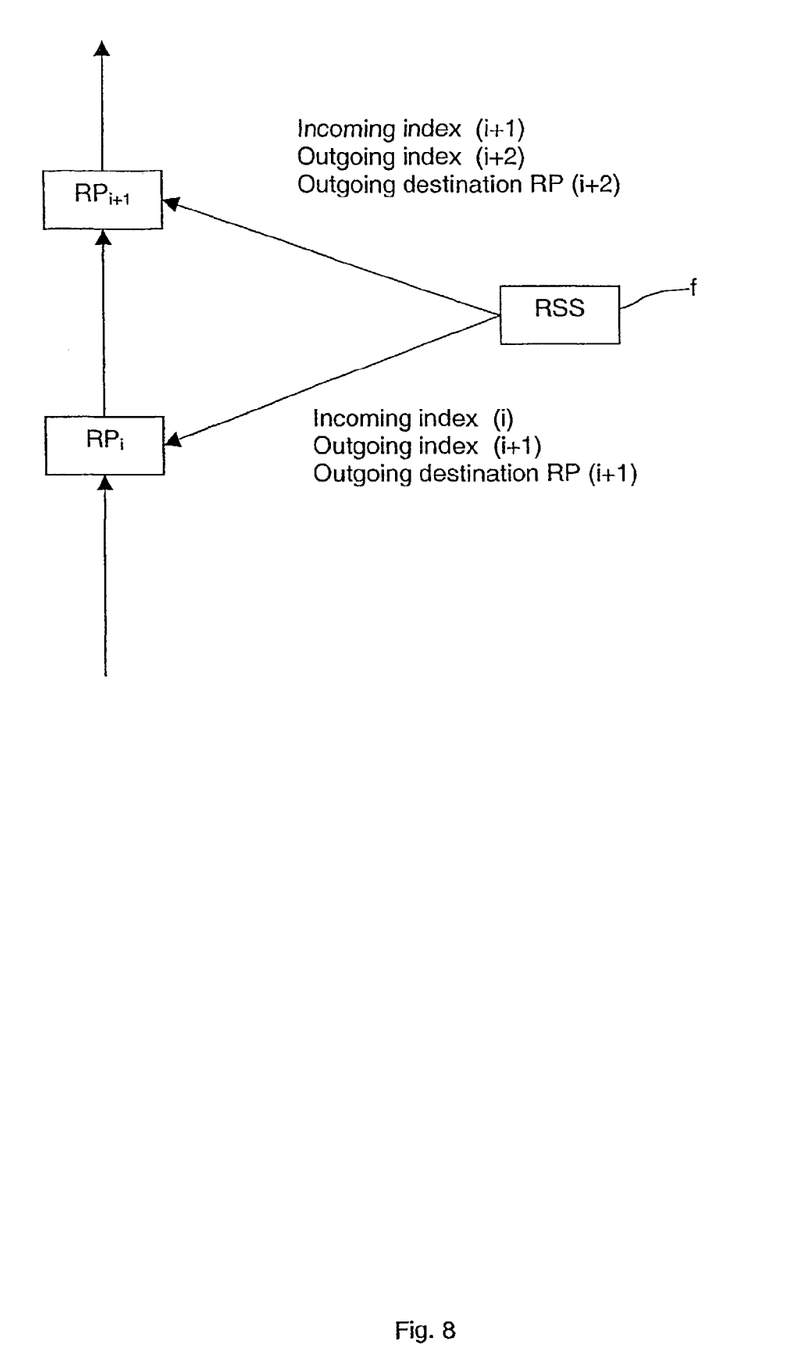
FIG. 8 is a diagram of a individual temporary addressing per relay node.

FIG. 8 illustrates a further embodiment using individual temporary addressing per relay node. Instead of using the same temporary address or index for each relay node, a new address can be allocated by the Relay Setup Server for each new relay node. This affects the information that has to be stored by relay Proxies and the substitutions that have to be provided when forwarding a packet from one relay node to the next. In addition to the substitution of next step destination, the next step index must also be substituted. A packet arrives at $RP_i$ provided with an incoming index (i). The RSS, located in the node f in FIG. 1, reads the incoming index and retrieves information about the next routing step. The next routing step is defined by the destination address to the next relay proxy to be used (outgoing destination $RP_{i+1}$) and the outgoing index (i+1). The outgoing index is associated with the relay proxy $RP_{i+1}$ and information that $RP_{i+1}$ stores for the next routing step of the overlay path. At $RP_{i+1}$ the outgoing index (i+1) from $RP_i$ is handled as an incoming index (i+1). $RP_{i+1}$ repeats action analogues to the actions performed by $RP_i$ and forwards the packs to the subsequent RPs. Said process is iterated until the final destination is reached.

Figure 9A:
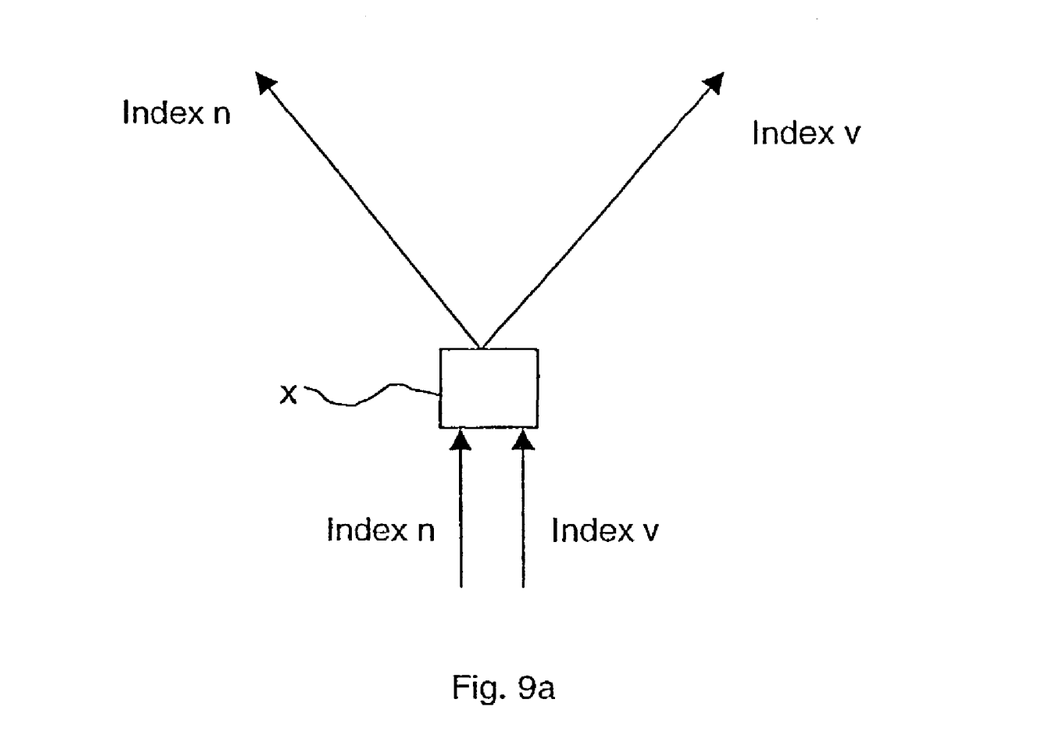
FIG. 9a is a diagram of a divided distribution of packets.

FIG. 9a illustrates separation of a packet stream. The packets are diverted in two different directions. A man skilled in the art understands that the packets may be diverted in more than two directions. The packet format used in the embodiment according to FIG. 9 is illustrated in FIG. 7. FIG. 7a shows that, at the cross point x in FIG. 9a, the indexes, Index n and Index v, indicates which path the two different packet flows are to take. In this embodiment, the packet flow having the index n is to take the left path, and the packet flow having the index v is to take the right path. The index indicator is stored together with the payload in the "augmented payload" field, as is shown in FIG. 7b.

Figure 9B:
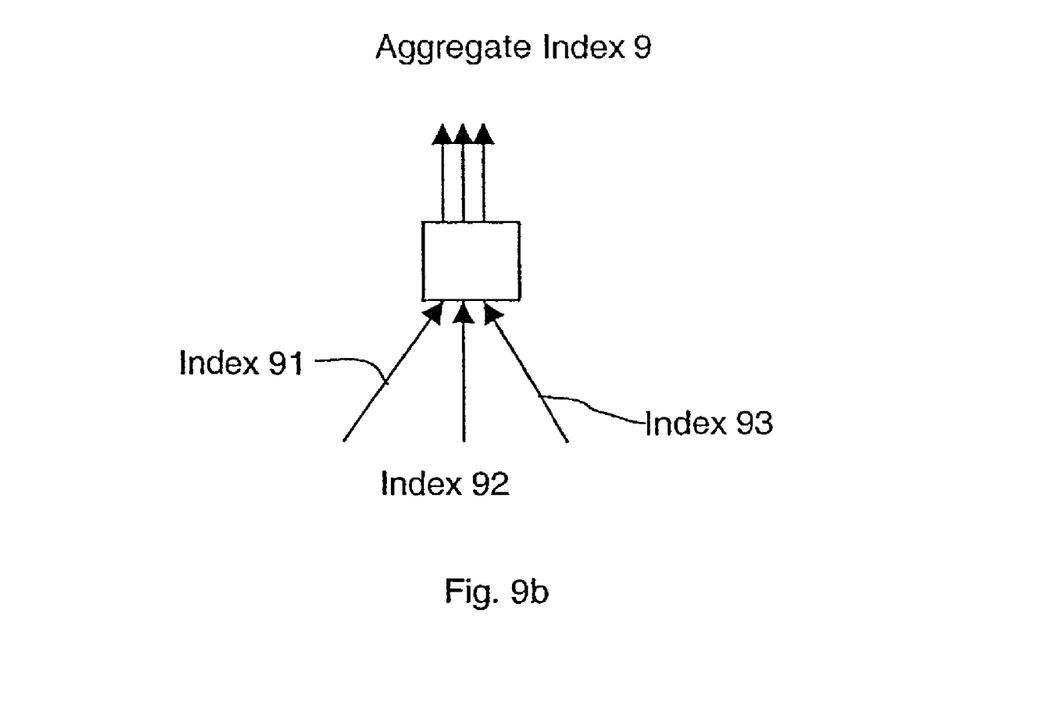
FIG. 9b is a diagram illustrating how incoming packets are converged into a common flow.

FIG. 9b illustrates the aggregation of three packet streams. Packets from different incoming paths are converged into a common flow when forwarding. The three packet flows are each provided with an individual index, index 91, index 92 and index 93. After the convergence point, these indexes are hidden in the augmented payload, as is shown in FIG. 7b. The converged flows use the same index, index 9 when leaving the convergence point. In order to enable the restoration of the original source/destination information of the different packets at their final destination, they must be provided with individual identifiers in addition to the shared identifier, which is disclosed in connection to FIG. 10.

Figure 10:
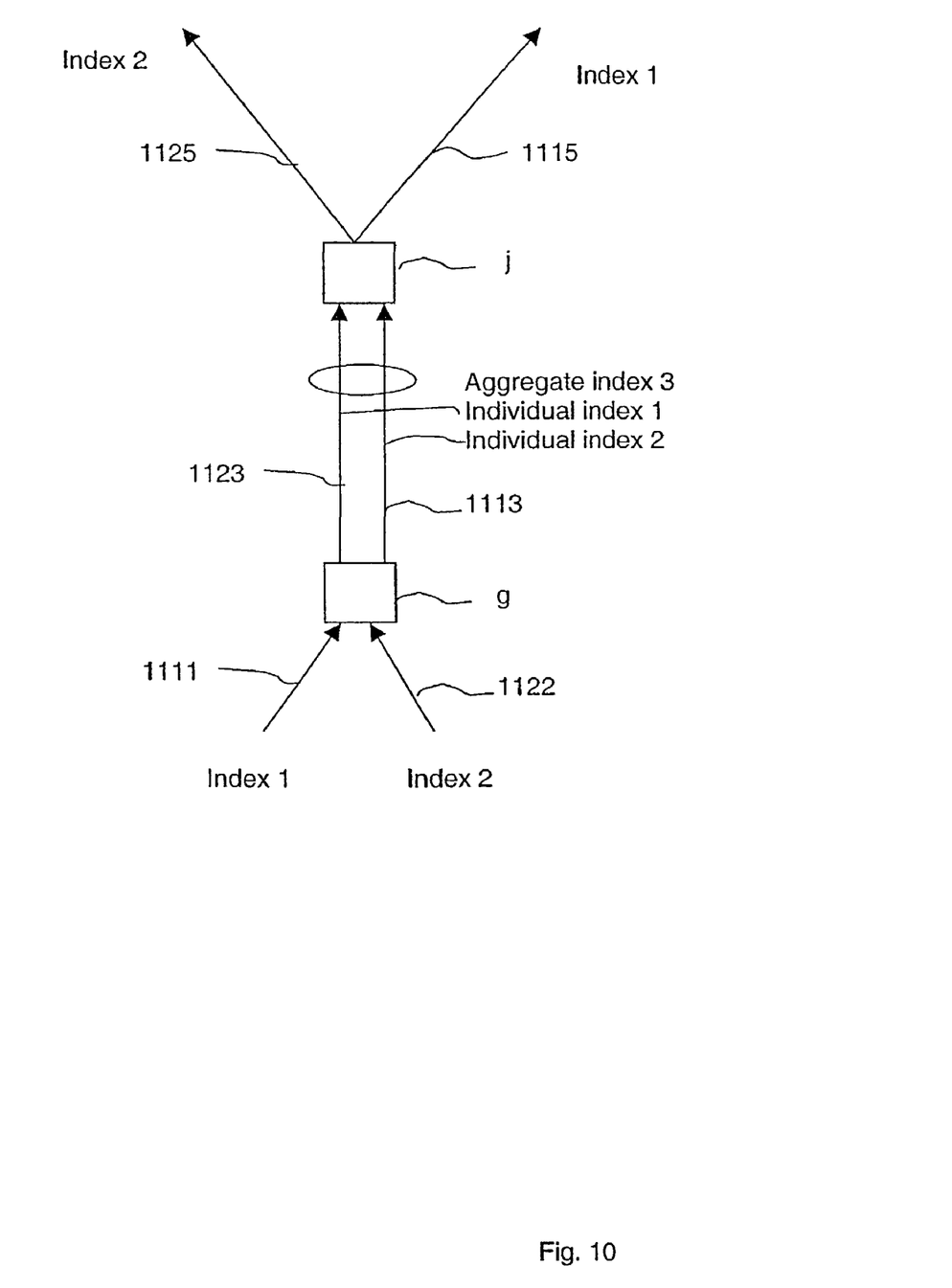
FIG. 10 is a diagram a diagram of an embodiment using both divergence and convergence of two packet flows.

FIG. 10 illustrates an embodiment using both the convergence and divergence of packet paths in the network 100 illustrated in FIG. 1. A path 1111 having an individual index 1 and a path 1122 having the individual index 2 are united in a node g to a common flow 1113 having an aggregate index 3. Packets having index 1 and 2 have the same next step destination, a node j. From the node g to the node j packets carry both an aggregate index, index 3, and individual indices, index 1 and index 2, respectively, and follows the same path, called path 1123 and path 1113. At the node j packets are separated into two paths, a path 1125 and a path 1115, based on their individual indexes. A number of intermediary relay nodes may be passed by the aggregate path. At these nodes, relay routing is only based on the aggregate index.

Figure 11A:
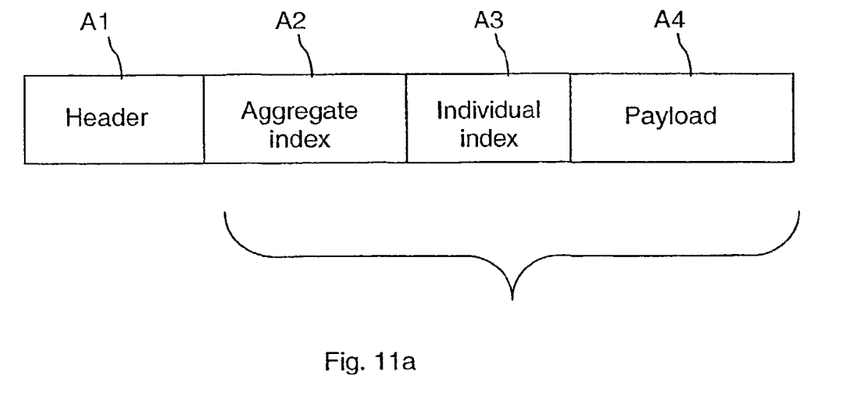
FIGS. 11a and 11b are diagrams showing the packet format used in the embodiment according to FIG. 10.
Figure 11B:
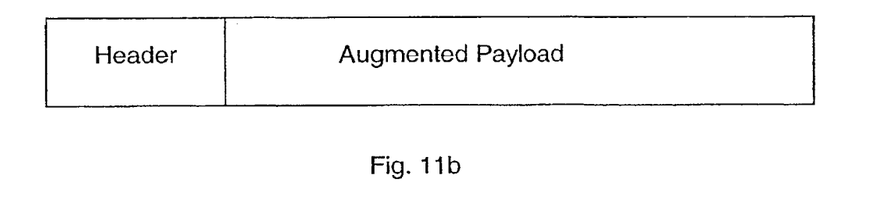

FIG. 11a illustrates a packet having a header A1, aggregate index A2, an individual index A3 and a payload A4. FIG. 11b illustrates how the aggregate index and the individual index are hidden in the augmented payload. At the node j the aggregate index is discarded and the traffic is separated in two different paths, a path 1125 having the index 2 and a path 1115 having the index 1. The packet format of the two flows 1125 and 1115 is illustrated in FIG. 7a and 7b.

The method of aggregation may be applied recursively whereby aggregated packet flows are again aggregated into higher levels of aggregation. Each tributary flow is then handled as individual flows in relation to the new level aggregate flow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of communicating in an Internet communication network having a plurality of interconnected Internet sub-nets, each sub-net having interconnected nodes, wherein communication takes place between two nodes in different Internet sub-nets, one of said nodes being an originating node and the other being a destination node, said method comprising:
providing an overlay network comprising a number of relay proxy (RP) servers provided in nodes of the sub-nets and a route setup server (RSS) in one of the nodes;
selecting by the RSS. a path between the originating node and the destination node based at least partly on quality requirements of the communication, said path using selected RP servers of the overlay network;
allocating to said communication, a temporary sending address that belongs to the RSS;
distributing to each selected RP server and storing therein, an association between the temporary sending address and the address to be used by each RP server as the destination address to the next RP server along the path;
transmitting a packet from the originating node, substituting the temporary sending address in place of the originating node address and using as a destination node address. the address of the RP server which is first along the path;
receiving the packet at the first RP server and transmitting the packet further along the path using as the originating node address, the temporary sending address and as the destination node address, the address of the next RP server along the path, wherein the address of the next RP server along the path is given by the association which is stored in the first RP server;
repeating the above receiving step at each RP server along the path until the packet is received at the last RP server prior to the destination node, at which the packet includes the address of the originating node as the packet's originating node address, and includes the address of the destination node as the packet's destination node address, wherein the originating node address and the destination node address are given by the association stored at the last proxy server, and receiving the packet at the destination node.

2. The method in accordance with claim 1, wherein the step of selecting a path includes selecting said path based on quality of service and/or type of service.

3. The method in accordance with claim 2, further comprising diverting forward and return traffic in the communication separately.

4. The method in accordance with claim 1, wherein the step of allocating a temporary sending address includes selecting the temporary sending address from a pool of temporary addresses.

5. The method in accordance with claim 1, wherein the temporary sending address is provided with an index which is inserted in the payload of the packet.

6. The method in accordance with claim 5, wherein each RP server, when reading the temporary sending address used as the originating node address in the incoming packet,
reads the index in the payload of the incoming packet;
retrieves from the stored association, the index to be used as destination address to the next RP server along the path; and
inserts in the payload, the index to be used as the destination address to the next RP server.

7. The method in accordance with claim 6, wherein packets which arrive to a first RP server from different RP servers and which are to travel to a common second RP server along a common path are embedded in an augmented payload of a packet, each with a respective index, and the header of the packet with the augmented payload is provided with an index to be used as the destination address to the next RP server.

8. An arrangement for communicating in an Internet communication network having a plurality of interconnected Internet sub-nets, each sub-net having interconnected nodes, wherein communication takes place between two nodes in different Internet sub-nets, one of said nodes being an originating node and the other being a destination node, said arrangement comprising:
an overlay network, comprising:
a number of relay proxy (RP) servers provided in nodes of the sub-nets; and
a route setup server (RSS) in one of the nodes for selecting a path for the communication in the overlay network based on knowledge of the topology of the Internet communication network, knowledge of where in the Internet communication network the RP servers are located, and quality requirements for the communication;
wherein the RSS administers temporary addresses belonging to the RSS to be used as originating addresses for packets communicated from the originating node to the destination node;
wherein the RSS includes means for communicating to each RP server along the selected path, an association between the temporary sending address and the address to be used by each RP server as the destination address to the next RP server along the path;
means provided within each RP server for storing the association between the temporary sending address and the address to be used as the destination address to the next RP server along the path;
means for transmitting a packet from the originating node, substituting the temporary sending address in place of the originating node address and using as a destination node address, the address of the RP server which is first along the path;
means for receiving the packet at the first RP server and transmitting the packet further along the path using as the originating node address, the temporary sending address and as the destination node address, the address of the next RP server along the path, wherein the address of the next RP server along the path is given by the association which is stored in the first RP server;

wherein the means for receiving the packet and transmitting the packet is performed at each RP server along the path until the packet is received at the last RP server prior to the destination node, at which the packet includes the address of the originating node as the packet's originating node address, and includes the address of the destination node as the packet's destination node address, and wherein the originating node address and the destination node address are given by the association stored at the last proxy server; and means for receiving the packet at the destination node.

9. The arrangement in accordance with claim 8, further comprising a pool of temporary addresses that belong to the RSS.

* * * * *

UNITED STATES PATENT AND TRADEMARK OFFICE
CERTIFICATE OF CORRECTION

PATENT NO. : 7,257,646 B2 Page 1 of 1
APPLICATION NO. : 10/311090
DATED : August 14, 2007
INVENTOR(S) : Jonsson It is certified that error appears in the above-identified patent and that said Letters Patent is hereby corrected as shown below:

In Column 11, Line 33, in Claim 1, delete "RSS." and insert -- RSS, --, therefor.

In Column 11, Line 46, in Claim 1, delete "address." and insert -- address, --, therefor.

Signed and Sealed this

Nineteenth Day of August, 2008

JON W. DUDAS
*Director of the United States Patent and Trademark Office*